Aug. 15, 1933.  C. H. HOFFSTETTER ET AL  1,922,585
BROILER OVEN
Filed Oct. 10, 1931    3 Sheets-Sheet 1
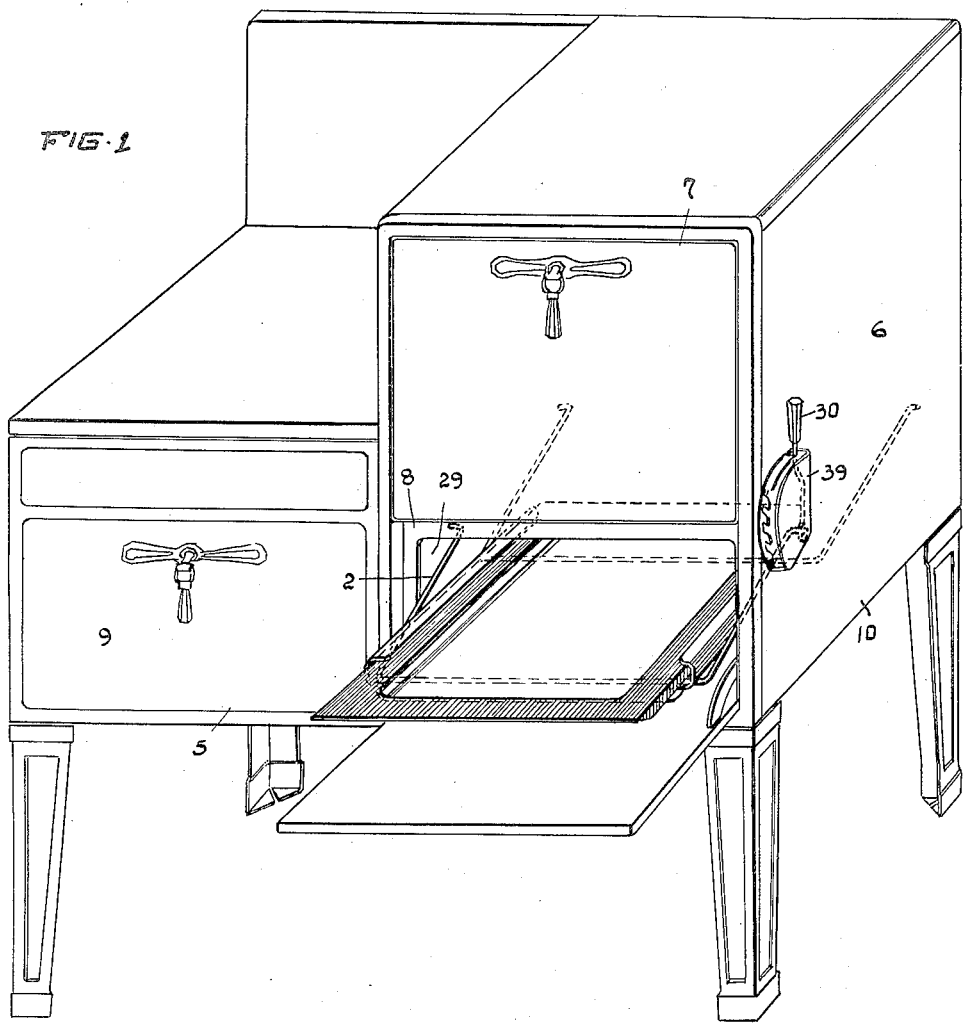
INVENTOR
CARL H. HOFFSTETTER
ROBERT F. HOFFSTETTER
BY
ATTORNEY

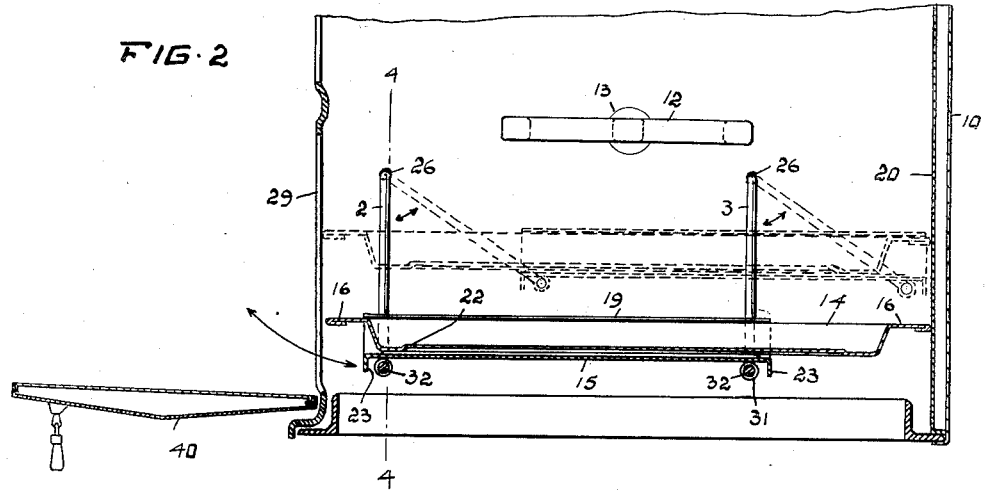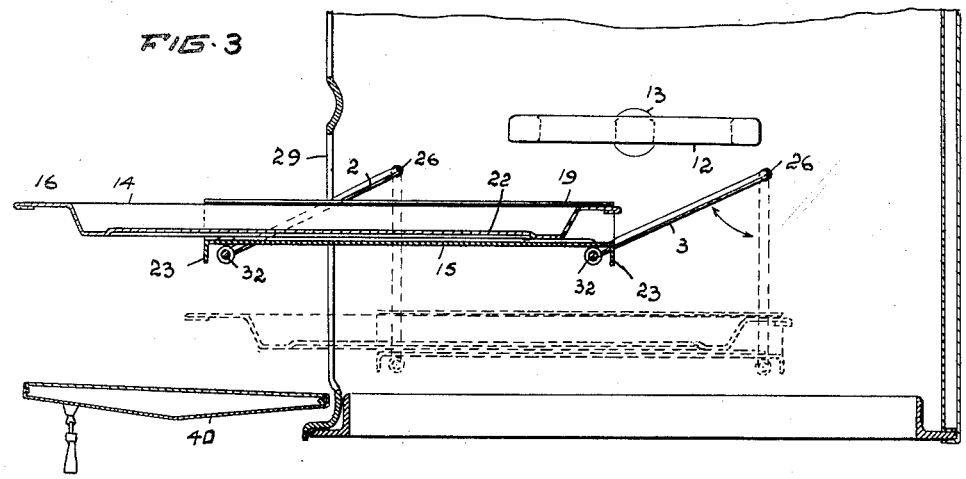

Aug. 15, 1933.  C. H. HOFFSTETTER ET AL  1,922,585
BROILER OVEN
Filed Oct. 10, 1931  3 Sheets-Sheet 3
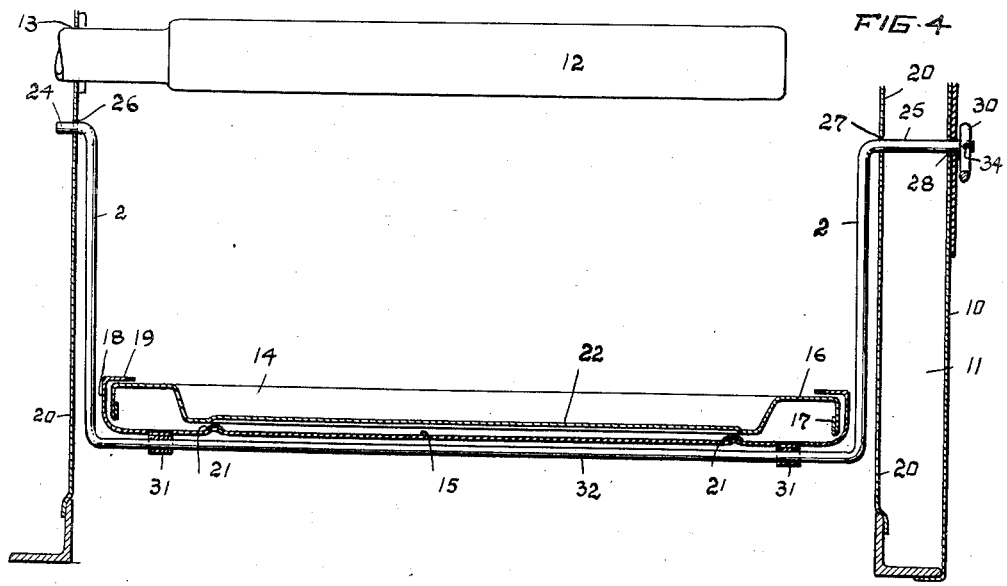
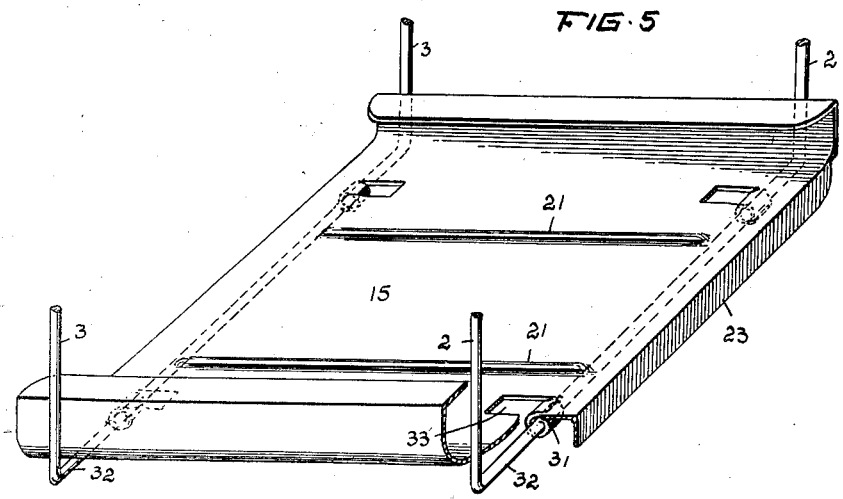
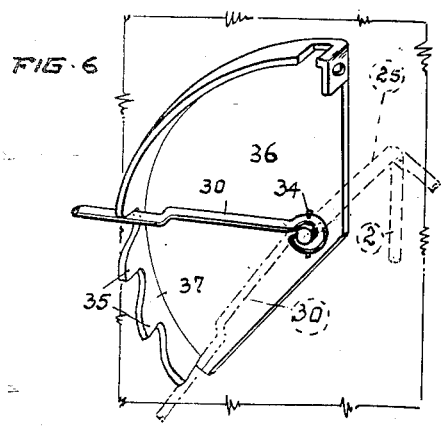
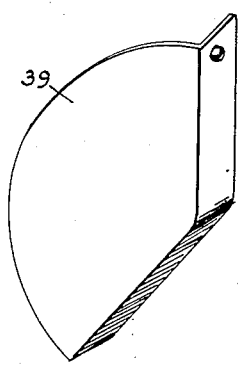
INVENTOR
CARL H. HOFFSTETTER
ROBERT F. HOFFSTETTER
BY
Fisher, Moser & Moore
ATTORNEY Patented Aug. 15, 1933

1,922,585

UNITED STATES PATENT OFFICE 1,922,585

BROILER OVEN

Carl H. Hoffstetter and Robert F. Hoffstetter, Erie, Pa.

Application October 10, 1931. Serial No. 568,167

8 Claims. (Cl. 126—41)

This invention pertains to ovens, and more particularly broiler ovens, for gas, oil, electric and other types of stoves or ranges.

Heretofore it has been the practice to provide stepped tracks for supporting a broiler pan, by means of which the pan could be adjusted to a position close to or remote from the burner, according to requirement. It has also been proposed to provide a broiler oven with a sliding drawer-like container for a broiler pan or grid, such drawer being provided with stepped tracks on which the broiler pan may be mounted, but in such prior structures, it is necessary for the operator to handle the hot broiler pan in elevating or lowering the latter with respect to the burner. In other prior structures where special mechanism is employed for raising and lowering the broiler pan with respect to the burner, separate means such as a removable door has been necessary for moving the broiler pan out of and into the oven.

The principal object of our invention is to provide a broiler oven in which the means employed for adjusting the broiler pan toward or away from the burner is also capable of moving the pan inwardly or outwardly partially through the broiler oven door opening without the necessity of handling, with consequent danger of injury to the operator.

Another object of the invention is to provide a simply constructed freely swinging and readily operable support for a food containing pan or shelf by virtue of which ready access may be had to the contents of the pan for inspection or other purposes.

Another object of the invention is to provide a swinging support for the food pan or shelf whereby the pan may be swung outwardly and inwardly through the door opening without disturbing the parallel relation of the pan with respect to the stove burner or other source of heat.

Another object of the invention is to provide conveniently operable means for swinging the food pan outwardly through the oven door opening to permit of inspection, basteing, etc., including means for locking the pan in any desired adjusted exposed position.

A further object of the invention is to provide a pan support and operating means therefor, for moving a food pan outwardly and inwardly through the door opening or toward and away from the burner, including means for simultaneously centering the pan with respect to the heating element.

Other objects and advantages of our invention will be apparent from the following description when read with the accompanying drawings, in which Figure 1 is a perspective view of a range showing the broiler pan support and broiler pan projected through the door opening.

Figure 2 is a cross sectional view through the broiler oven showing the broiler pan and its support in lowered position in full lines and in raised position in dotted lines.

Figure 3 is a cross sectional view similar to Figure 2, showing the pan and its support in full and dotted lines in the positions assumed when these parts are automatically swung from Figure 2 dotted line position first to a lowered projected and then an elevated projected position with the door open.

Figure 4 is an enlarged cross sectional view on the line 4—4 of Fig. 2.

Figure 5 is a perspective view of the pan support partly broken away to show the pivotal connection between the pan support and the swinging arms.

Figure 6 is a perspective view of the locking mechanism, and

Figure 7 is a perspective view of the cover plate for the locking mechanism shown in Figure 6.

Referring more particularly to the drawings wherein we have illustrated a preferred embodiment of our invention, as applied to a gas range, 5 designates the range as a whole which includes an oven unit 6 comprising an upper baking oven 7 and a lower broiler oven 8, a general utility heating compartment 9 being also provided at one side of the unit 6. The outer preferably enameled walls 10 of the oven unit are provided with the usual inner sheet metal lining walls 20 sufficiently spaced from the exterior finished walls 10 to afford ample heat circulating space 11 therebetween.

Heat is supplied to the oven unit by means of a gas burner 12 which projects into the broiler oven through an opening 13 formed in the side sheet metal lining or wall 20. The roast or other content (not shown) of a broiler pan 14, positioned within the broiler oven 8, below the burner, is thus exposed directly to the burner flame. This broiler pan is specifically constructed for sliding movement relatively to and for swinging movement with a pan supporting member or plate 15. Thus pan 14 is provided with flat horizontally disposed side flanges 16 from which depend vertical flanges 17, for sliding engagement wtihin the confines of the upwardly projecting side flanges 18 and the inwardly extending horizontal top flanges 19 respective of the pan support 15. It will thus be seen that the pan 14, while rigidly supported by the member 15, is free to slide back and forth within the guiding flanges of the latter. Broiler pan 14 is considerably longer, from front to rear than the support 15 and overlaps or extends considerably beyond the front and rear stiffening flanges 23 of the latter. However, the broiler pan will always be securely held in horizontal position by the co-action of flanges 16 and 19, should the pan for some reason be projected or pulled almost entirely from its seat on the support member. Member 15, which like broiler pan 14, is preferably stamped from sheet metal, is formed in the die operation with two spaced ridges 21 running from front to rear for facilitating sliding movement of the broiler pan, in an obvious manner. The upper face of the bottom of pan 14 is also provided with a circularly struck up portion or strengthening rib 22 while the downwardly extending flanges 23 previously referred to, are formed on the front and rear edges of the member 15, for a similar purpose.

As previously stated it is essential that the broiler pan be maintained in horizontal position and centered with respect to the burner and during broiling, also that movement of the pan to exposed or projected position through the door opening 29 be a parallel one with respect to such adjusting horizontal positions. Accordingly the broiler pan support 15 is mounted, adjacent its front and rear ends upon a pair of substantially U-shaped arms 2 and 3, which in turn have angularly bent upper end portions 24—25 extending through oppositely disposed openings 26 and 27 in the side lining of the broiler oven, for pivotal movement therein. Bent end portion 25 of the front arm 2 is of sufficient length to also project through opening 28 in the enameled side wall of the oven adjacent the front door opening 29, for attachment to and support of the operating handle 30, in position for convenient manipulation of the latter. Arms 2 and 3 are preferably formed from heavy wire rod stock.

Attachment of the pan support 15 to the arms 2 and 3 is effected by means of apertured ears 31, through which the horizontal portions 32 of the arms freely extend, these ears being preferably integral with the support and formed by cutting the support or plate away as at 33 and rolling or bending the released material in an obvious manner to form the apertured cylindrical ear portions 31 two for each arm 2—3. The handle 30 is pivotally connected to the projecting end of front arm 2, by means of pin 34, to permit of the handle being laterally shifted for locking engagement with or disengagement from the ratchet teeth 35 of a plate 36 suitably secured to the right side wall of the oven unit. These teeth are formed in an arcuate flange 37 which projects outwardly from the plate. A flanged cover 39 suitably secured to the plate 36 not only enhances the appearance of the stove by concealing the handle connection from view but also serves as a guard for the ratchet teeth. Sufficient space exists between the edge of arcuate flange 37 and cover 39 for the necessary upward and downward manipulation of the handle.

While it is thought that the construction and operation of the invention will be clear from the foregoing, the following brief description of its operation may be helpful to a more complete understanding. Assuming that the broiler pan support and the broiler pan slidably supported thereon, are in the full line position illustrated in Figure 2, and the housewife finds it desirable to elevate the broiler pan into closer proximity to the burner, in order to effect this desideratum it is merely necessary to swing the handle or lever 30 downwardly from its Figure 6 or mid position to the position illustrated in dot-dash lines in Figure 6. This downward movement of the handle 30 swings the arms 2 and 3 rearwardly and upwardly, in an anti-clockwise direction, as shown by dotted lines in Figure 6, and as the pan support 15 is pivotally fixed to and supported upon the arms 2 and 3 these parts move in unison. As the width of the broiler pan from front to rear approximates the depth of the broiler oven, and extends beyond the front and rear edges of the support 15, this rearward and upward movement causes the rear edges of the pan 14 to engage the rear lining or wall of the oven. A continuation of this movement causes the support 15 to slide rearwardly with respect to the pan until the parts assume Figure 2, dotted line position. Handle 30 is then pushed inwardly or to the left about its pivot 34, into engagement with one of the lowermost ratchet teeth 35, thus locking the broiler pan in adjusted elevated position. Reverse movement of the handle 30, lowers the broiler pan to its original neutral or somewhat remote position with respect to the flame, where the food being broiled or toasted will be subjected to less intense heat. During this latter movement the broiler pan is forced against the oven door 40, and the support 15 is caused to slide forwardly relatively to the pan into Figure 2 full line position, while members 14 and 15 are moved downwardly in unison. The position of pan 14 never deviates from the horizontal, and it always remains centered with respect to the burner. It will also be seen that the relative movements of the pan and its support are always along parallel lines.

Should the operator desire to project the broiler pan forwardly through the oven door opening from either the dotted or full line position of the parts shown in Figure 2, for the purpose of basting, turning, or general observation, it is merely necessary to swing the handle 30 upwardly in a clockwise direction, whereupon the support 15 and broiler pan 14 will be swung forwardly in an obvious manner, and without any resulting relative sliding movement between these parts assuming that the door is first opened. When the pan 14 is thus swung from full line Figure 2 position, a reverse movement of the handle returns the pan to its normal centered and lowered position relative to the burner 12, assuming of course that the pan has not been manually withdrawn from the support. In the latter event, the mere closing of the door automatically pushes the pan inwardly and slidably with respect to its support. In elevating the pan to dotted line Figure 2 position, it will be noted that the resulting relative movement of the pan and pan support causes the forward end of the pan to project considerably beyond the front end of the support. Consequently, when the operator projects the pan through the open oven door from this position, by swinging the handle 30 upwardly or in anti-clockwise direction, the pan can be projected to a much greater extent, thus eliminating any necessity for manually withdrawing the pan, except for the purpose of emptying. However, if during removal and/or replacement of the pan, its position relative to the support be manually altered, the closing of the oven door will automatically push the pan to its normal centered position relative to the burner.

What we claim is:

1. A stove or range comprising an oven having a door opening, a door for said opening and a source of heat; a broiler or like pan approximately equal in length to the depth of said oven mounted within said oven, and a single means for moving the pan within the oven while in sliding contact with the door and rear wall thereof vertically toward and away from the source of heat and for projecting the pan outwardly through the oven door opening when said door is opened.

2. In a device of the character described, a broiler oven having a door opening, a door covering said opening and an overhead source of heat, a broiler pan, approximately equal in length to the depth of said oven, a support for said broiler pan arranged within said oven, and a single means for elevating and lowering said support and moving said pan vertically with respect to said source of heat when in sliding contact with the door and rear wall of said oven and for projecting said support and pan outwardly through the oven door opening when said door is opened.

3. In a device according to claim 1, a support provided with means for slidably carrying said broiler or like pan to permit vertical movement of said pan toward or away from the source of heat.

4. A stove or range comprising an oven having a front door opening, a door for said opening, a broiler pan support in said oven having guiding portions at opposite sides, pivotally supported arms pivotally interconnected with integral ear portions formed in the bottom of said support, and a pan having flanged portions fitting said guiding portions, said pan being dimensioned to approximately the depth of said stove to induce vertical movement of said pan when contacting with the door and the rear wall of said oven during swinging movement of said supporting arms and broiler pan support within said oven, and said pivotally supported arms being dimensioned to project the pan support and pan outwardly through said front door opening, when said door of said oven is opened.

5. A stove or range comprising an oven having a door opening, a door for said opening, a broiler pan support in said oven having approximately half the depth of said oven, a pan slidably mounted on said support extending from front to rear of the oven, means pivotally connected to said support for elevating and lowering same within said oven and holding said support continuously in horizontal position and for moving said pan vertically within said oven when in sliding contact with the door or rear wall of said oven, said means being adapted to project said support and pan outwardly through the oven door opening when said door is opened.

6. A stove or range comprising an oven having a source of heat therein, a front door opening and a door for said opening, a broiler pan support having approximately half the depth of said oven, a pan of approximately the dimensions of the oven seated on said support for vertical movement within said oven and relative sliding movement with respect to said support, and means pivotally suspending said support in the oven for elevating and lowering said support within the oven and vertically shifting said pan within said oven and horizontally shifting same with respect to said support when in sliding contact with the door or rear wall of said oven, said means being adapted to extend said pan support and pan in elevated position outwardly through the oven door opening, when said oven door is opened.

7. In a device of the class described, an oven having a compartment, a door for said compartment, a source of heat for said oven, a food supporting pan of elongated form having a length approximately equal to the depth of said compartment, and means for swingingly and slidably suspending said food supporting means within said compartment and projecting same in elevated position beyond the door thereof, said swinging means being pivotally suspended in a plane at right angles to the longer axis of said food supporting means to induce vertical shifting of said food supporting means within said oven in an upward and downward direction when said door of said compartment is closed.

8. A stove or range comprising an oven, a broiler or like pan approximately equal in length to the depth of said oven mounted within said oven, and a single means for moving the pan within the oven vertically in opposite directions when in sliding contact with the front and rear portion of the oven and for projecting said pan outwardly through the front of said oven, when said pan is not contacting with the front portion of said oven.

CARL H. HOFFSTETTER.
ROBERT F. HOFFSTETTER.